United States Patent [19]

Flatau

[11] 4,451,614
[45] May 29, 1984

[54] PROCESS FOR THE PRODUCTION OF POURABLE, TACK-FREE VINYL CHLORIDE GRAFT POLYMERS

[75] Inventor: Karsten Flatau, Haltern, Fed. Rep. of Germany

[73] Assignee: Chemische Werke Huels, AG, Marl, Fed. Rep. of Germany

[21] Appl. No.: 409,465

[22] Filed: Aug. 19, 1982

[30] Foreign Application Priority Data

Aug. 19, 1981 [DE] Fed. Rep. of Germany ....... 3132694

[51] Int. Cl.$^3$ .............................................. C08F 00/00
[52] U.S. Cl. ...................................... 525/80; 524/904
[58] Field of Search ........................... 525/80; 524/904

[56] References Cited

U.S. PATENT DOCUMENTS

| | | | |
|---|---|---|---|
| 3,167,598 | 1/1965 | Heaps et al. | 525/80 |
| 3,358,054 | 12/1967 | Hardt et al. | 260/878 |
| 3,494,784 | 2/1970 | De Coene et al. | 117/100 |
| 3,522,351 | 7/1970 | Zimmerman et al. | 424/229 |
| 3,528,967 | 9/1970 | Zimmerman et al. | 260/239.75 |
| 3,641,206 | 2/1972 | Weitzel et al. | 525/80 |
| 3,853,970 | 12/1974 | Dietrich | 525/80 |
| 4,185,048 | 1/1980 | Buning et al. | 525/80 |
| 4,356,283 | 10/1982 | Weinlich et al. | 525/80 |

FOREIGN PATENT DOCUMENTS

| | | | |
|---|---|---|---|
| 1027710 | 4/1966 | United Kingdom | 525/80 |
| 1200531 | 7/1970 | United Kingdom . | |

Primary Examiner—Allan Lieberman
Attorney, Agent, or Firm—Millen & White

[57] ABSTRACT

Pourable, tack-free vinyl chloride graft polymers based on ethylene-vinyl acetate copolymers and vinyl chloride, having more than 30% by weight of ethylene-vinyl acetate copolymer content, are prepared by thermally precipitating small amounts (0.5–10 wt. %) of polyvinyl chloride in the form of a latex onto the graft polymer.

8 Claims, No Drawings

4,451,614

PROCESS FOR THE PRODUCTION OF POURABLE, TACK-FREE VINYL CHLORIDE GRAFT POLYMERS

BACKGROUND OF THE INVENTION

The present invention relates to a process for the production of a pourable (free-flowing), tack-free graft polymer of vinyl chloride onto ethylene-vinyl acetate copolymers, having a high ethylene-vinyl acetate copolymer content.

Conventional vinyl chloride graft copolymers having a high elasticizer resin content ($\geq 30\%$, especially 40%) have insufficient pourability and tend to stick together during storage. The lumped-together material must in some cases be crushed prior to processing. The poorly flowing powder is hard to introduce into the processing units. The aforementioned poor powder properties reduce output during processing. Therefore, it is desirable to provide such graft copolymers of vinyl chloride which are readily pourable, remain pourable under stresses of pressure and temperature, and which as bulk material do not solidify.

The production of impact-resistant graft polymers of vinyl chloride onto ethylene-vinyl acetate copolymers having a vinyl acetate content of 20–80% by weight is conventional (German Pat. No. 1,495,694). It is also known to produce impact-resistant products by blending ethylene-vinyl acetate copolymers with polyvinyl chloride. Graft copolymerization, as compared with the production of mixtures, has the advantage that the graft copolymer of high elastomer content is less tacky and can be more easily blended with polyvinyl chloride. Graft copolymers having more than 30% ethylene-vinyl acetate content, however, are too tacky. The products have insufficient pourability for processing and lump together, for example, when stored in bags on pallets.

DAS No. 1,694,918 describes a process for the preparation of a dry, tack-free powder, which does not cake during storage, and which is composed of solid elastomer products. In this process, a latex, the solids content of which is composed of 30–100% by weight of an elastomeric polymer, the remainder being a nonelastomeric polymer, is made to coagulate under agitation with the addition of coagulants. The coagulate is mixed with 0.5–25% by weight of a hard polymer, for example polyvinyl chloride, in latex form. The latex is recoagulated before the finished product is separated and dried. In this way, products are produced, for example, consisting of 40–60% by weight of a vinyl acetate-ethylene copolymer with 45–95% vinyl acetate and 60–40% by weight of polyvinyl chloride. The resultant products are in the form of flakes.

Pourable mixtures of ethylene-vinyl acetate copolymers and pulverulent polyvinyl chloride are obtained by homogenizing ethylene-vinyl acetate copolymers and polyvinyl chloride in high-speed mixers with a mixing ratio of 1:3 to 2:1, quenching the product with water, and grinding the product in a high-speed mill with the addition of dusting agents, whereafter the product is dried (DOS No. 2,540,378). This process requires high proportions of polyvinyl chloride; furthermore, the method consists of many working steps and thus is comparatively expensive.

It is furthermore known from DOS No. 1,694,816 to produce graft polymers which do not lump together by coagulating the graft polymer and mixing the coagulate with the latex of a hard polymer. This procedure also requires a coagulant, the presence of which interferes with the subsequent processing, primarily due to the ensuing water sensitivity of the products and their impaired electrical properties.

SUMMARY OF THE INVENTION

Accordingly, it is an object of this invention to provide a process and the corresponding product, whereby the foregoing disadvantages are significantly ameliorated or are eliminated and the desired pourable, tack-free polymers are produced.

Upon further study of the specification and appended claims, further objects and advantages of this invention will become apparent to those skilled in the art.

These disadvantages of the prior art have been surprisingly overcome and these objects achieved by a process for the production of pourable, tack-free vinyl chloride graft polymers of an ethylene-vinyl acetate copolymer and vinyl chloride, having more than 30% by weight of ethylene-vinyl acetate copolymer content, comprising adding to a suspension of the vinyl chloride graft polymer, 0.5–10% by weight, based on the weight of the graft polymer, of polyvinyl chloride prepared by emulsion or microsuspension polymerization in the form of a latex, and effecting thermal precipitation of the polyvinyl chloride onto the graft polymer.

DETAILED DISCUSSION

Suitable vinyl chloride graft polymers of ethylene-vinyl acetate copolymer and vinyl chloride have ethylene-vinyl acetate contents of more than 30% by weight, e.g., 30–80% by weight, and especially more than 40% by weight, e.g., 40–60% by weight.

These polymers can be prepared by fully conventional methods, e.g., by suspension polymerization of vinyl-chloride in the presence of ethylene-vinyl acetate copolymers, as described, for example, in German Pat. No. 1,495,694, whose disclosures are incorporated by reference herein. In this process, the suspension polymerization can be conducted in any desired conventional way in the presence of any one of the customary, monomer-soluble catalysts, for example those from the groups of the diacyl, dialkyl, or aroyl peroxides, e.g. diacetyl, dibenzoyl, dilauroyl, 2,4-dichlorobenzoyl peroxide; of the peroxydicarbonates, such as diisopropyl, dicyclohexyl, di-tert-butylcyclohexyl, diethylcyclohexyl, dimyristyl, dicetyl, distearyl peroxydicarbonate; of the peresters, such as isopropyl peracetate, tert-butyl peracetate, tert-butyl peroctoate, tert-butyl perpivalate, tert-butyl perneodecanoate, isoamyl perneodecanoate; of the mixed anhydrides of organic sulfoper-acids and organic acids, such as, for example, acetylcyclohexylsulfonyl peroxide; of the azo compounds, such as, e.g. azoisobutyric acid nitrile (azobisisobutyronitrile), and azobisdimethylvalerodinitrile. The catalysts can be used in conventional amounts from 0.01 to 0.3% by weight, based on the amount of vinyl chloride.

Furthermore, the suspension polymerization can be conventionally carried out in the presence of one or several conventional protective colloids, e.g. partially saponified polyvinyl acetates, cellulose derivatives, such as water-soluble methylcellulose, carboxymethylcellulose, hydroxyethylcellulose, methylhydroxypropylcellulose, as well as gelatin, polyalkylene oxides or mixed polymers of maleic acid and/or its monoesters (half esters) and styrenes. The amount of protective colloids employed usually is 0.01–1% by weight, preferably 0.05–0.4% by weight.

Also, the suspension polymerization can be conventionally conducted in the presence of 0.01–5% by weight, based on the amount of monomers, of cosuspension agents utilized in admixture with the above-recited protective colloids. Examples of suitable conventional cosuspension agents are: partial fatty acid esters of polyhydric alcohols, such as glycerol monostearate, sorbitan monolaurate, oleate, or palmitate, polyoxyethylene ethers of fatty alcohols or of aromatic hydroxy compounds; polyoxyethylene esters of fatty acids, polypropylene oxide-polyethylene oxide condensation products, as well as partially saponified polyvinyl acetates having a degree of saponification of about 30–50 molar percent.

The polymerization temperature of the suspension polymerization is generally 30°–70° C. The resultant suspension polymers have K-values of 50–70, preferably 55–65 (DIN 53 736). Agitation can be provided by customary impeller agitators with normal speed.

The ethylene-vinyl acetate copolymer usually contains 30–70% by weight of vinyl acetate units.

0.5–10% of emulsion of microsuspension polyvinyl chloride, preferably 3–5 (or, better, 4–5) % by weight of polyvinyl chloride, of a K-value of 50–90, preferably 60–80, based on the weight of the graft copolymer, is precipitated onto the graft copolymer of vinyl chloride and ethylene-vinyl acetate copolymers produced in suspension.

Suitable emulsion or microsuspension polyvinyl chloride dispersions can be conventionally produced discontinuously, or continuously, according to seed latex methods or by microsuspension polymerization, using the emulsifier and initiator systems customary in emulsion polymerization and/or microsuspension polymerization.

Suitable catalysts used in the production by means of conventional emulsion polymerization include all water-soluble free radical catalysts customary in emulsion polymerization, for example persulfates, such as potassium, sodium, or ammonium persulfate, hydrogen peroxide, tert-butylhydroperoxide, sodium perborate, potassium percarbonate, or other water-soluble peroxides, as well as also corresponding mixtures. Peroxide catalysts can also be utilized, conventionally, in the presence of 0.01–1% by weight, based on the amount of monomers, of one or several reducing substances, suitable for buildup of a redox catalyst system, such as, for example, sulfites, bisulfites, dithionites, thiosulfates, aldehyde sulfoxylates, for example formaldehyde sulfoxylate. In general, about 0.075 to 0.1% by weight, based on the weight of the monomers, of catalyst or redox system is required.

Furthermore, emulsion polymerization can be conducted in the presence of 0.01–5% by weight, based on the amount of monomers, of one or several emulsifiers. Suitable emulsifiers are anionic, amphoteric, cationic, as well as nonionic emulsifiers. Examples of suitable anionic emulsifiers include: alkali metal, alkaline earth metal or ammonium salts of fatty acids such as lauric, palmitic, or stearic acid, of acidic fatty alcohol sulfuric acid esters, of paraffin sulfonic acids, of alkylarylsulfonic acids, such as dodecylbenzenesulfonic acid or dibutylnaphthalenesulfonic acid, of sulfosuccinic acid dialkyl esters; as well as the alkali metal and ammonium salts of epoxy-group-containing fatty acids, such as epoxystearic acid. Examples of suitable amphoteric or cationic emulsifiers include: alkyl betains, e.g. dodecyl betain; alkyl pyridinium salts, such as laurylpyridinium hydrochloride; and alkyl ammonium salts, such as oxyethyldodecylammonium chloride. Suitable nonionic emulsifiers include, for example: partial fatty acid esters of polyhydric alcohols, such as glycerol monostearate, sorbitan monolaurate, oleate, or palmitate, polyoxyethylene ethers of fatty alcohols or aromatic hydroxy compounds; polyoxyethylene esters of fatty acids; as well as polypropylene oxide-polyethylene oxide condensation products.

The emulsion polymerization can be accomplished at conventional temperatures of 30°–90° C., preferably 60°–70° C., and under the usual pressures, by the batch or continuous-feed method, wherein a portion of the monomers is provided and the rest is subsequently added in metered quantities.

The microsuspension polymerization is likewise effected by fully conventional methods. These methods are disclosed, for example, in German Pat. Nos. 962,834 and 1,069,387; DAS's 1,050,062 and 1,076,373; British Pat. No. 698,359; and U.S. Pat. No. 2,674,585. All of these disclosures are incorporated by reference herein.

After suspension polymerization is completed, 0.5–10% by weight, preferably 3–5% by weight of the mentioned polyvinyl chloride is added in latex form. The addition of the polyvinyl chloride is generally made directly to the suspension medium containing the graft polymer after completion of suspension polymerization of the latter. Typical amounts of graft polymer in the suspension are 30–40 wt. %.

The polyvinyl chloride is generally added in the latex form in which it is obtained directly after completion of emulsion or microsuspension polymerization. Such latices usually have solids contents of 40–45 wt. %.

The polyvinyl chloride is then thermally precipitated onto the suspension graft polymer. For example, the suspension-latex mixture is then stirred at temperatures of 30°–90° C., preferably 55°–85° C., for a period of time of 10–60 minutes at agitating speeds customary in suspension polymerization. By means of this step, the polyvinyl chloride is uniformly precipitated onto the suspension graft polymer. Prolonging the agitation at 55°–85° C., though possible, does not improve results.

Conventional reactor degasification for VC monomer recovery, which usually follows polymerization, can be effected simultaneously with the agitation of the suspension-latex mixture at 55°–85° C.

The suspension polymers with polyvinyl chloride precipitated thereon can be processed according to fully conventional methods, e.g., they can be vacuum-filtered or centrifuged and dried in flash dryers, drum-type dryers, etc. The resultant products are pourable and do not lump together during storage, i.e., they have a low bulk cohesion.

Pourability can be tested in a simple way using a series of funnels with differing apertures and determining at which point the powder ceases to flow out freely (see M. Doysen, I. Cronebaum, "Plastverarbeiter" [Plastics Processor] 23 (8): 549 (1972), which is incorporated by reference herein). A readily pourable powder flows readily out of a funnel having an aperture of 2 mm, while poorly flowable material runs out only when the funnel aperture has a diameter of, for example, 20 mm.

Such an indication of pourability, however, by itself is not sufficient to provide information on whether a product will tend to stick and lump together, in practice. One measure for the lumping tendency is the bulk cohesion which can be determined, for example, in a shear cell apparatus such as that of Jenike, see I. Schwedes, Chem. Ing. Techn. 43 (4): 254 (1976), which is incorporated by reference herein. The method yields information on whether a pourable, loose powder solidifies under the effects of pressure and high temperatures. High bulk cohesion values mean high tendency toward lumping. Low bulk cohesion means good pourability.

Unless indicated otherwise herein, all details of the preparation and properties of the graft polymer and of the polyvinyl chloride, as well as of the precipitation of the latter onto the former, are fully conventional and disclosed in the references cited above whose disclosures are incorporated by reference herein.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

The following examples demonstrate the improvements, attainable according to the process of this invention, in the powder properties of graft polymers of vinyl chloride on ethylene-vinyl acetate copolymers.

EXAMPLE 1

(a) Preparation of a Graft Polymer:

3,000 parts of a copolymer of ethylene and vinyl acetate with a vinyl acetate content of 45%, 5,400 parts of vinyl chloride, 60 parts of methylcellulose, 19,800 parts of water, and 18 parts of $\alpha,\alpha'$-azobisisobutyronitrile are stirred in an autoclave for 5 hours at room temperature. Then the mixture is polymerized for 20 hours at 60° C.

(b) Preparation of Emulsion Polyvinyl Chloride:

Into an autoclave having a capacity of 13 m$^3$ and equipped with a jacket cooler and paddle-type agitator, the following materials are introduced per hour: about 776 kg of vinyl chloride, 690 l of an aqueous solution containing 2% by weight of an alkanesulfonate (alkyl chains having 10–18 carbon atoms, on the average 15 carbon atoms) and 2 kg of phosphoric acid, 24 l of a 0.25% by weight aqueous hydrogen peroxide solution (~0.008% by weight, based on vinyl chloride), 24 l of a 0.1% by weight aqueous ascorbic acid solution (0.003% by weight, based on vinyl chloride); the filling level, as is usual, is about 90%. The pH value is 6.3. The polymerization temperature is maintained at 50° C. Conversion is about 91% by weight. A stable dispersion having a solids content of about 50% results. The K value of the polymer is 70.

(c) Preparation of Polymer of this Invention:

A 15-liter reactor, equipped with paddle-type stirrer, is charged with 10 kg of a 30% aqueous suspension of the vinyl chloride graft polymer produced according to (a) which has a K-value of 75 and contains 50% of an ethylene-vinyl acetate copolymer having 45% by weight of vinyl acetate units.

Under agitation, 100 g and 400 g, respectively, of the emulsion polyvinyl chloride prepared according to (b) is stirred into the suspension, and then agitation is continued for about 60 minutes at 60° C.

After about one hour, the mixture is removed by vacuum-filtering and dried at 50° C. in a fluidized bed.

The dry, pourable powder exhibits the following properties, as compared to the untreated graft polymer:

| Product | Pourability (mm) | Bulk Cohesion at 50° C. After | | |
|---|---|---|---|---|
| | | 1 h | 2 h | 24 h |
| Untreated graft co-polymer | 4 | 2,220 | Outside of Measured Range | |
| Treated graft co-polymer | | | | |
| 1% E PVC | 2 | 2,230 | Outside of Measured Range | |
| 4% E PVC | 2 | 340 | 470 | 600 |

EXAMPLE 2

A vinyl chloride graft copolymer was produced according to (a) having 50% ethylene-vinyl acetate units and a K-value of 75. After the pressure drop, the reactor was charged with 1% and 4%, respectively, of emulsion polyvinyl chloride, based on the amount of suspension polymer, prepared according to (b) in latex form. The suspension-latex mixture was maintained at 60° C. for one hour under agitation. The finished product was vacuum-filtered and dried and showed the following powder characteristics.

| Product | Pourability (mm) | Bulk Cohesion at 50° C. After | |
|---|---|---|---|
| | | 1 h | 24 h |
| Untreated graft co-polymer | 4 | 2,220 | Outside of Measured Range |
| Treated graft co-polymer | | | |
| 1% E PVC | 2 | 1,520 | 3,470 |
| 4% E PVC | 2 | 550 | 1,880 |

The preceding examples can be repeated with similar success by substituting the generically or specifically described reactants and/or operating conditions of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for producing a pourable, tack-free vinyl chloride graft polymer of an ethylene-vinyl acetate copolymer and vinyl chloride, having more than 30% by weight of ethylene-vinyl acetate copolymer content, comprising adding to a suspension of the vinyl chloride graft polymer 0.5–10% by weight, based on the weight of the graft polymer, of polyvinyl chloride prepared by emulsion or microsuspension polymerization in the form of a latex and having a K value of 50–90, effecting thermal precipitation of the polyvinyl chloride onto the graft polymer by maintaining the mixture of polyvinyl chloride and graft polymer, with stirring for 10–60 minutes, at a temperature of 30°–90° C., and separating the graft polymer with the polyvinyl chloride precipitated thereon from the mixture.

2. A process of claim 1 further comprising separating the graft polymer with polyvinyl chloride precipitated thereon by filtering and then drying the separated polymer.

3. A process of claim 1, wherein the amount of polyvinyl chloride precipitated onto the graft polymer is 3–10% by weight based on the weight of the graft polymer.

4. A process of claim 1, wherein the amount of polyvinyl chloride precipitated onto the graft polymer is 4–10% by weight based on the weight of the graft polymer.

5. A process of claim 1, wherein the amount of polyvinyl chloride precipitated onto the graft polymer is 3–5% by weight based on the weight of the graft polymer.

6. A process of claim 1, wherein the graft polymer has an ethylene-vinyl acetate content of 30–80% by weight and the ethylene-vinyl acetate portion has a vinyl acetate portion of 30–70% by weight.

7. A pourable, tack-free vinyl chloride graft polymer consisting essentially of
   (a) 90–99.5 wt. % of a graft polymer of (i) 30–80% by weight of an ethylene-vinyl acetate copolymer, consisting essentially of (aa) 30–70% by weight of vinyl acetate units and (bb) 70–30% by weight of ethylene units, and (ii) 20–70% by weight of vinyl chloride portion; and
   (b) 0.5–10 wt. % of emulsion or microsuspension polyvinyl chloride precipitated thereon.

8. A pourable tack-free vinyl chloride graft polymer prepared by the process of claim 1.

* * * * *